United States Patent
Hiscock

(10) Patent No.: US 8,848,827 B2
(45) Date of Patent: Sep. 30, 2014

(54) CHIRP COMMUNICATIONS USING INTERLEAVED SYMBOLS OF VARYING PERIODS

(75) Inventor: Paul Dominic Hiscock, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 0 days.

(21) Appl. No.: 13/471,734

(22) Filed: May 15, 2012

(65) Prior Publication Data

US 2012/0300810 A1 Nov. 29, 2012

(30) Foreign Application Priority Data

May 24, 2011 (GB) .................................. 1108665.9

(51) Int. Cl.

| | | |
|---|---|---|
| *H04W 4/08* | (2009.01) | |
| *H04B 17/00* | (2006.01) | |
| *H04W 52/24* | (2009.01) | |
| *H04B 1/692* | (2011.01) | |
| *H04L 1/00* | (2006.01) | |
| H04W 72/08 | (2009.01) | |
| H04W 52/02 | (2009.01) | |
| H04L 27/26 | (2006.01) | |
| H04B 1/69 | (2011.01) | |
| H04B 1/713 | (2011.01) | |
| H04W 52/32 | (2009.01) | |
| H04W 48/10 | (2009.01) | |
| H04J 13/00 | (2011.01) | |

(52) U.S. Cl.
CPC ............ *H04B 1/692* (2013.01); *H04L 27/2613* (2013.01); *H04B 17/0077* (2013.01); *H04B 2001/6912* (2013.01); *H04B 1/713* (2013.01); *H04W 52/245* (2013.01); *H04L 1/0002* (2013.01); *H04L 1/003* (2013.01); *H04W 52/325* (2013.01); *Y02B 60/31* (2013.01); *H04W 48/10* (2013.01); *H04J 13/0062* (2013.01)
USPC ........... 375/296; 375/227; 375/224; 375/295; 455/67.14; 455/67.11; 455/39; 455/115.3; 455/115.1; 455/522; 455/517; 455/507; 455/500; 370/252; 370/241; 370/312; 370/310

(58) Field of Classification Search
CPC . H04W 52/245; H04W 52/325; H04W 48/10; H04B 17/0077; H04L 1/003; H04L 1/0002; H04L 1/08; H04L 27/2613; Y02B 60/31
USPC ................ 375/139, 130, 227, 224, 296, 295; 455/522, 517, 507, 500, 39, 67.14, 455/67.11, 115.3, 115.1; 342/175, 204; 370/252, 241, 312, 310
See application file for complete search history.

(56) References Cited

U.S. PATENT DOCUMENTS

| | | | |
|---|---|---|---|
| 6,064,695 A | 5/2000 | Raphaeli | |
| 2004/0100897 A1* | 5/2004 | Shattil | ............................ 370/206 |
| 2007/0149232 A1* | 6/2007 | Koslar | ........................... 455/522 |
| 2008/0310479 A1* | 12/2008 | Koslar et al. | .................. 375/131 |
| 2010/0013711 A1* | 1/2010 | Bartlett | ......................... 342/442 |

FOREIGN PATENT DOCUMENTS

GB 2473316 3/2011

OTHER PUBLICATIONS

IEEE 802.15.1 standard, Part 15.1, 2002, p. 7.*
Great Britain Search Report for GB Application No. GB1108665.9, dated Aug. 8, 2012.

* cited by examiner

Primary Examiner — Chieh M Fan
Assistant Examiner — Michelle M Koeth
(74) Attorney, Agent, or Firm — RatnerPrestia

(57) ABSTRACT

A method of communicating a chirp signal from a transmitter suitable for receipt at a proximal receiver and a distal receiver, the chirp signal including a plurality of packets, each packet including at least one symbol, each symbol including one or more identical chirps, the method including: generating the chirp signal by interleaving constituent packets of: (i) a first set of packets encoded with first data, each packet including one or more symbols having a first time period $t_1$, and (ii) a second set of packets encoded with second data, each packet including one or more symbols having a second time period $t_2$, where $t_1 < t_2$; and transmitting the generated chirp signal.

16 Claims, 6 Drawing Sheets

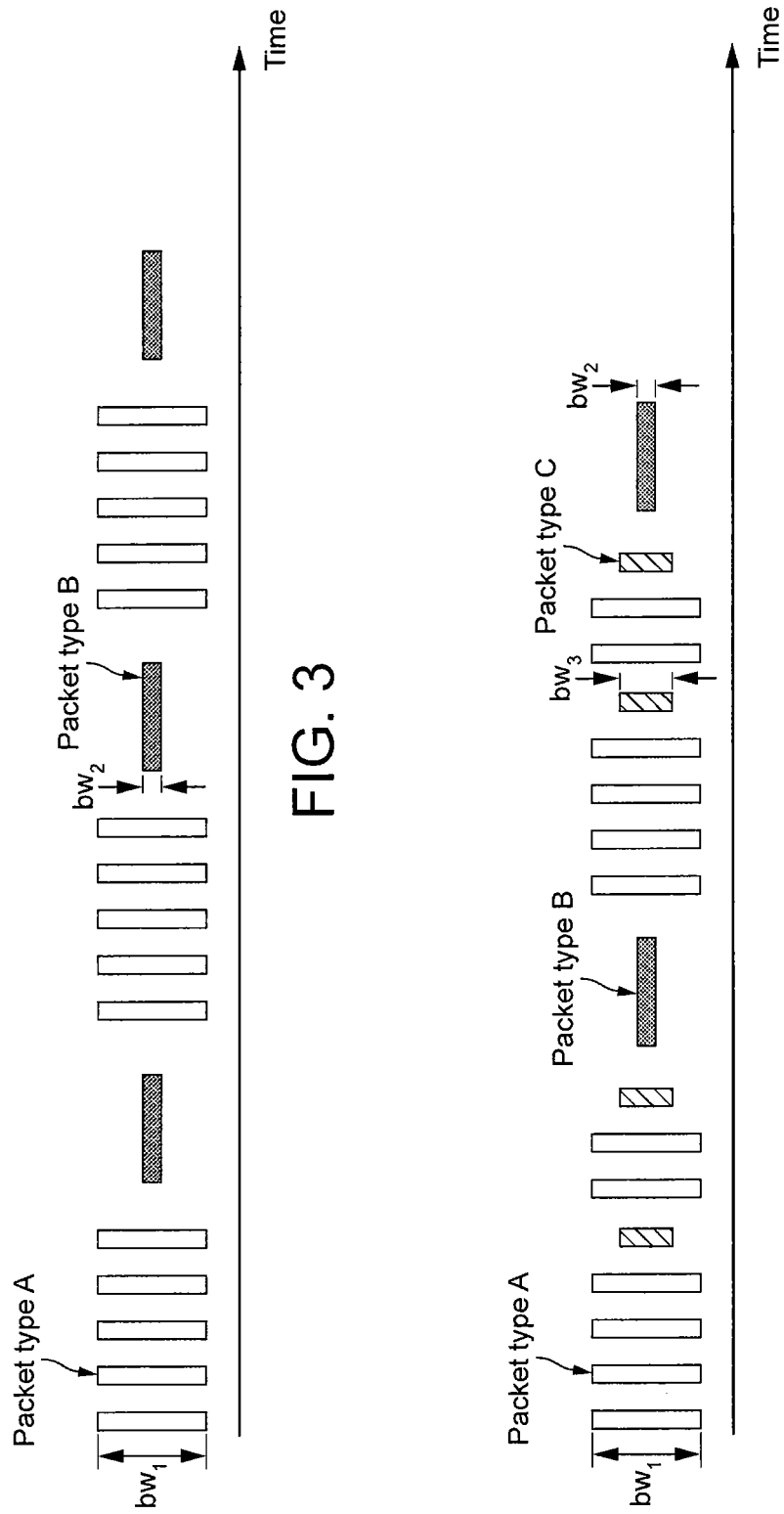

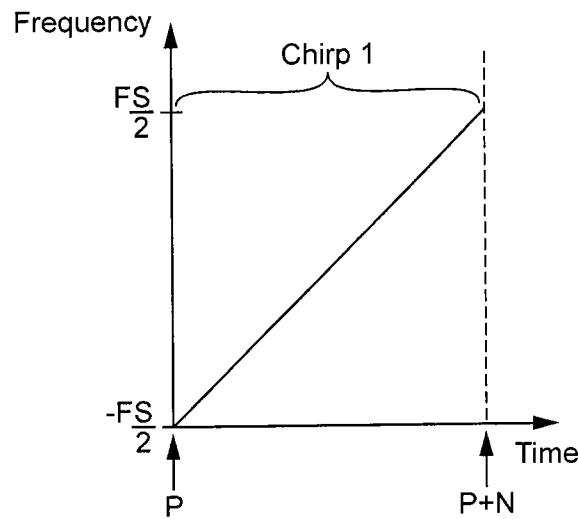
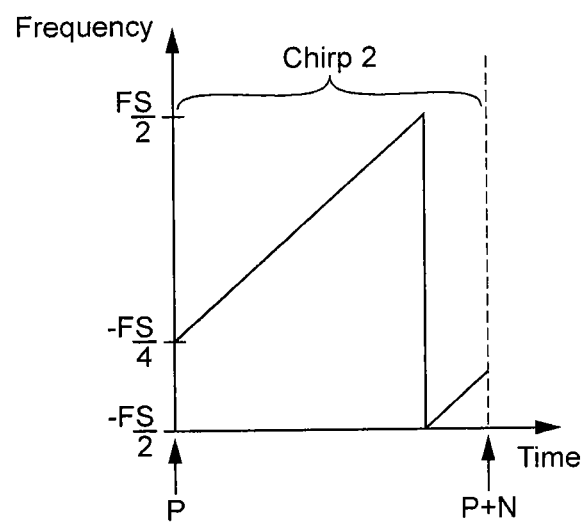
FIG. 5

CHIRP COMMUNICATIONS USING INTERLEAVED SYMBOLS OF VARYING PERIODS

FIELD OF THE INVENTION

The present disclosure relates to chirp communications, and in particular to communicating a chirp signal from a transmitter that is suitable for receipt at both a proximal receiver and a distal receiver.

BACKGROUND

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g, p) = e^{j\pi g(n - fn(p))(n + 1 - fn(p))/N} \qquad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0, to N−1, in order. The number of valid values of p is the symbol set size, which is nominally N. However, the symbol set size can be more or less than N depending on the quality of the link. The value of g can have any value greater than 0, and less than N. Preferably, g is an integer between 1, and N−1. Due to the modular nature of this expression negative gradients are obtained from N−1 backwards. Hence, N−2, is equivalent to a negative gradient of −2. Where there are more than one identical contiguous chirps in a symbol, each chirp individually conveys the same value which is the symbol value of the symbol.

Chirp 1 in FIG. 1 has a starting frequency of −Fs/2, and a gradient of 1. It increases linearly in frequency over a period of N samples at a sample rate of Fs to reach a frequency close to +Fs/2. Since this is a complex sampled system +Fs/2, is the same as −Fs/2. Multiple chirps are usually contiguous but may start with a different frequency. The signal phase is typically made continuous throughout a sequence of chirps. In other words, after the signal has reached +Fs/2 at n=N−1,, the next symbol starts with n=0, again. FIG. 1 illustrates an example in which two consecutive chirps have the same symbol value, whereas the third chirp is different. An apparent discontinuity in frequency between chirp 1 and chirp 2 occurs at n=N.

Chirp 4 in FIG. 2 has a gradient of 2, and a starting frequency of −Fs/2. Because it has double the gradient of the chirps of FIG. 1, it increases linearly in frequency to +Fs/2, in half the number of samples that the chirps in FIG. 1 do, i.e. it reaches close to +Fs/2, after close to N/2 samples. The chirp then wraps around in frequency. Since this is a sampled system, these frequency wraps are in effect continuous and have continuous phase. The chirp repeats the frequency sweep from −Fs/2, to +Fs/2, between samples N/2, and N.

The chirps also have continuous frequency and phase from one end of the chirp to the other. A cyclic shift of the samples that make up a chirp creates another valid chirp.

Chirp communications are typically used in systems operating using low data rates and short messages. In such systems, the transmitter typically transmits messages periodically, for example a remote temperature tag may periodically transmit a message indicating a measured temperature. Typically, the transmitter does not know the location or local environment of the receiver or receivers which are to receive the message it transmits. Reliable receipt of the transmission at distal receivers as well as close by receivers is desirable. Reliable receipt of the transmission at receivers subject to high levels of interference or noise is desirable. One solution is to transmit the messages with sufficiently high power to be detectable by all receivers within a predetermined range. However, chirps signals are typically communicated between low power devices, for example battery powered handheld devices and in environments where there could be multiple simultaneous transmitting devices. Transmission of frequent high power signals causes an undesirable drain on the power reserves of a battery powered device, and also causes undesirable interference to other users of the system.

Rather than transmitting at a high power, one solution to enable reliable receipt of the transmission at a distal receiver, or a receiver subject to high levels of interference or noise, is to increase the sensitivity of the receiver by adding error correction bits, for example forward error correction (FEC). However, FEC requires the transmission of additional bits, which incurs additional delay and requires more energy. FEC is suitable for higher value communications systems where large numbers of silicon gates are acceptable. Chirp communications allow for low power and small silicon area solutions and are targeted at very high volume and very low cost markets. Hence, additional gates for FEC circuitry, in both the transmitter and receiver, are proportionally expensive and power hungry.

Thus, there is a need for an improved method of communicating a chirp signal from a transmitter that is suitable for receipt at both a proximal receiver and a distal or noisy receiver in a communication system operating using small silicon areas, low power and short messages and in environments where there could be multiple simultaneous transmitting devices.

SUMMARY

According to a first aspect, there is provided a method of communicating a chirp signal from a transmitter suitable for receipt at a proximal receiver and a distal receiver, the chirp signal comprising a plurality of packets, each packet comprising at least one symbol, each symbol comprising one or more identical chirps, the method comprising: generating the chirp signal by interleaving constituent packets of: (i) a first set of packets encoded with first data, each packet comprising one or more symbols having a first time period $t_1$, and (ii) a second set of packets encoded with second data, each packet comprising one or more symbols having a second time period $t_2$, where $t_1 < t_2$; and transmitting the generated chirp signal.

Suitably, the first data is the same as the second data.

Suitably, the one or more symbols of each packet of the first set of packets have a first bandwidth $bw_1$, and the one or more symbols of each packet of the second set of packets have a second bandwidth $bw_2$, wherein $bw_1 > bw_2$.

Suitably, the method comprises generating the chirp signal such that the ratio of packets of the first set of packets to packets of the second set of packets in the chirp signal is greater than 1.

Suitably, the number of chirps per symbol of the first set of packets is different to the number of chirps per symbol of the second set of packets.

Suitably, the method is suitable for receipt at the proximal receiver, the distal receiver, and at least one further receiver located between the proximal and distal receivers, the method comprising generating the chirp signal by interleaving constituent packets of: (i) the first set of packets, (ii) the second set of packets, and (iii) at least one further set of packets encoded with third data, each packet comprising one or more symbols having a time period between $t_1$, and $t_2$.

Suitably, the first data, second data and third data are the same.

Suitably, the one or more symbols of each packet of the at least one further set of packets have bandwidths between $bw_1$, and $bw_2$.

Suitably, the method comprises: negotiating a frequency hopping sequence between the transmitter and a receiver; and transmitting the generated chirp signal such that the sequence of centre frequencies of consecutive packets of the generated chirp signal matches the frequency hopping sequence.

Suitably, the method comprises: negotiating a frequency hopping sequence between the transmitter and a receiver; and transmitting the generated chirp signal such that the sequence of centre frequencies of consecutive symbols of the generated chirp signal matches the frequency hopping sequence.

Suitably, the method further comprises: receiving the transmitted chirp signal; and coherently integrating the one or more chirps of each symbol of a packet.

Suitably, the method further comprises: receiving the transmitted chirp signal; and non-coherently integrating the one or more chirps of each symbol of a packet.

According to a second aspect, there is provided a transmitter for communicating a chirp signal suitable for receipt at a proximal receiver and a distal receiver, the chirp signal comprising a plurality of packets, each packet comprising at least one symbol, each symbol comprising one or more identical chirps, the transmitter comprising: a chirp generator configured to generate the chirp signal by interleaving constituent packets of: (i) a first set of packets encoded with first data, each packet comprising one or more symbols having a first time period $t_1$, and (ii) a second set of packets encoded with second data, each packet comprising one or more symbols having a second time period $t_2$, where $t_1 < t_2$; and a transmitter module configured to transmit the generated chirp signal.

Suitably, the chirp generator is configured to generate the chirp signal such that the ratio of packets of the first set of packets to packets of the second set of packets in the chirp signal is greater than 1.

Suitably, the transmitter is for communicating a chirp signal suitable for receipt at the proximal receiver, the distal receiver, and at least one further receiver located between the proximal and distal receivers, the chirp generator configured to generate the chirp signal by interleaving constituent packets of: (i) the first set of packets, (ii) the second set of packets, and (iii) at least one further set of packets encoded with third data, each packet comprising one or more symbols having a time period between $t_1$, and $t_2$.

Suitably, the transmitter comprises a processor configured to negotiate a frequency hopping sequence between the transmitter and a receiver; and wherein the transmitting module is configured to transmit the generated chirp signal such that the sequence of centre frequencies of consecutive packets of the generated chirp signal matches the frequency hopping sequence.

Suitably, the transmitter comprises a processor configured to negotiate a frequency hopping sequence between the transmitter and a receiver; and wherein the transmitting module is configured to transmit the generated chirp signal such that the sequence of centre frequencies of consecutive symbols of the generated chirp signal matches the frequency hopping sequence.

BRIEF DESCRIPTION OF THE DRAWINGS

The following disclosure will now be described by way of example with reference to the accompanying drawings. In the drawings:

FIG. 3 illustrates a chirp signal comprising two packet types;

FIG. 4 illustrates a chirp signal comprising three packet types;

FIG. 5 illustrates encoding data via the starting frequency of a chirp;

DETAILED DESCRIPTION

Figure 1:
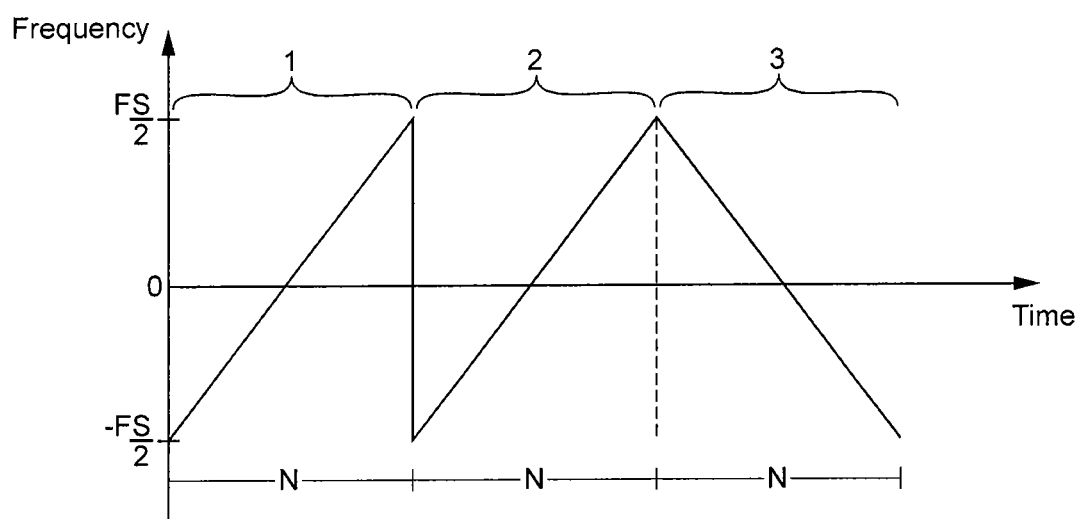
FIG. 1 illustrates a sequence of chirps in the frequency-time plane.
Figure 2:
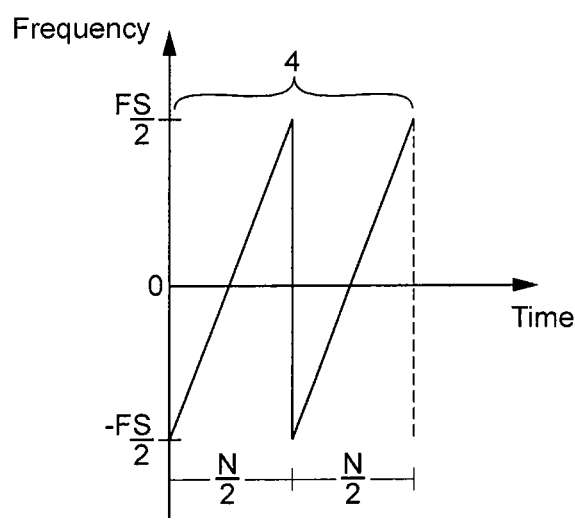
FIG. 2 illustrates a chirp having a gradient of 2, in the frequency-time plane.

The following disclosure is directed at a method of communicating a chirp signal from a transmitter, the chirp signal being suitable for receipt by receivers located both close by the transmitter and far away from the transmitter. The transmitter achieves this by interleaving packets having different packet types in the chirp signal. Each packet comprises one or more symbols. A first packet type is particularly suited to being received by a proximal receiver. A second packet type is particularly suited to being received by a distal receiver or by a receiver suffering from high interference or noise.

Each chirp in a chirp signal has a number of properties that can be varied. For example, the symbol period can be varied to create the first and second packet types. The short symbol and short packet type benefit a proximal receiver, in that they are received with less latency. The long symbol and long packet type benefit a distal or noisy receiver, in that they can be integrated to increase the signal level.

The symbol period is inversely proportional to the bandwidth. Hence, with a fixed transmit power and with other properties remaining constant, the frequency-time space can remain fixed regardless of using long or short symbols. Hence, the choice of interleaving different combinations of long and short symbols can have minimal impact on the interference to other users.

Further packet types particularly suited to being received by receivers located at varying distances from the transmitter may also be employed. Packets of different types may contain different amounts of data that reflect the packet length. For example, long packets may contain poorer quality speech data, whereas short packets may contain higher quality speech. Alternatively, each packet may be encoded with the same data, whether it is of the first, second or further packet type. In this way, the information carried by the signal is accessible by receivers located at varying distances from the transmitter. This process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g, p) = e^{j\pi g(n - fn(p))(n + 1 - fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0, to N−1, in order. The number of valid values of p is the symbol set size, which is nominally N. However, the symbol set size can be more or less than N depending on the quality of the link. The value of g can have any value greater than 0, and less than N. Preferably, g is an integer between 1, and N−1. Due to the modular nature of this expression negative gradients are obtained from N−1 backwards. Hence, N−2, is equivalent to a negative gradient of −2. Where there are more than one identical contiguous chirps in a symbol, each chirp individually conveys the same value which is the symbol value of the symbol.

Chirp signals have several properties which are configurable by a transmitter. One of these properties is the time period of each symbol of the chirp signal. Suitably, the first packet type comprises symbols which have a short symbol period and hence a higher sample rate and higher bandwidth. Because these packets are short they have a relatively low latency, which is desirable for a user. The short symbols limit the amount of coherent integration of the received signal. The higher bandwidth also increases the noise in the received signal. Together, these reduce the signal to noise ratio and lower the sensitivity. Hence, the short symbol packet is detectable by a proximal receiver but not a distal receiver. Suitably, the second packet type comprises symbols having a long symbol period and therefore a lower sample rate and lower bandwidth. Because these packets are long they have a relatively high latency, which is less desirable for a user. Assuming the receiver and transmitter clock frequencies do not drift significantly over a symbol period, the long symbols allow more coherent integration of the received signal than short symbols. The lower bandwidth decreases the noise in the received signal. Together, these increase the signal to noise ratio of the received signal and increase the sensitivity. Hence, the long symbol packet is detectable by both a distal (or noisy) receiver and a proximal receiver. Preferably, packets of both types are transmitted using the same transmit power. Alternatively, to meet certain spectral requirements, packets of both types may be transmitted using the same power spectral density.

A further configurable property of chirp signals is the frequency of repetition of packets comprising long symbols and the frequency of repetition of packets comprising short symbols. Preferably, packets comprising the shorter symbols are repeated more frequently in the chirp signal that packets comprising longer symbols. The consequence of this is that proximal receivers are able to quickly detect the information from a frequently occurring packet comprising short symbols, whereas distal receivers on average have longer to wait to detect the same information from a less frequently occurring packet comprising long symbols. Suitably, packets of a particular type are spaced regularly throughout the signal. A packet of a particular type may be repeated every T seconds. Alternatively, the spacing between packets of the same type may vary throughout the signal.

Typically, a receiver attempts to receive the frequent short symbol packet. If this is successful, then the receiver reads the data conveyed by the packet. If the receiver is unable to successfully decode the frequent short symbol packet, then it attempts to receive the less frequent long symbol packet. Suitably, on successfully receiving the transmitted signal, the receiver responds to the transmitter thereby establishing a connection between them. Suitably, the receiver and the transmitter negotiate properties of the communication to use.

For example, the receiver suitably indicates the time period of the symbols that it detected. The transmitter then suitably continues to transmit chirp signals to the receiver using only that symbol size.

A further configurable property of chirp signals is the number of repeats of each chirp within a symbol. Suitably, each packet type is configured to have a respective number of chirp repeats in a symbol. Suitably, first and second packet types within an interleaved signal have a different number of chirps repeated per symbol. For example, the interleaved signal may comprise a first packet type and a second packet type, the first packet type having a short time period, wide bandwidth and one chirp per symbol, and the second packet type having a long time period, short bandwidth and multiple chirps per symbol. This additional flexibility allows each receiver to decide how best to integrate the interleaved signals depending on the quality of the signal as received by the receiver. For example, in the example mentioned above, the receiver may successfully read the first packet type having the short symbol period. Alternatively, the receiver may read the second packet type and coherently integrate the multiple chirps in order to more accurately decode the signal. Hence, the use of multiple chirps per symbol in a transmitted chirp signal, allows the sensitivity of each receiver to be optimised without the transmitter knowing the quality of each receiver.

Reference is now made to FIG. 3. FIG. 3 illustrates an exemplary chirp signal generated by a transmitter which is suitable for receipt at both a proximal receiver and a distal receiver. The chirp signal comprises interleaved packets of packet type A and packet type B. Packet type A consists of symbols having a short time period $t_1$, and a high bandwidth $bw_1$. Packet type B consists of symbols having a long time period $t_2$, and a short bandwidth $bw_2$. The ratio of packets of packet type A to packets of packet type B is greater than 1. Packets having packet type A are suitable for being received by proximal receivers. Packets having packet type B are suitable for being received by distal receivers as well as proximal receivers.

Reference is now made to FIG. 4. FIG. 4 illustrates an exemplary chirp signal generated by a transmitter which is suitable for receipt at receivers located at varying distances from the transmitter. The chirp signal comprises interleaved packets of packet type A, packet type B, and packet type C. Packet types A and B are as described with reference to FIG. 3. Packet type C consists of symbols having a time period $t_3$, and a bandwidth $bw_3$, where $t_1 < t_3 < t_2$, and $bw_1 > bw_3 > bw_2$. The ratio of packets of packet type C to packets of packet type B is greater than 1. The ratio of packets of packet type C to packets of packet type A is less than 1. Packets having packet type A are suitable for being received by proximal receivers. Packets having packet type C are suitable for being received by proximal receivers and intermediate receivers located further from the transmitter than the proximal receivers. Packets having packet type B are suitable for being received by proximal receivers, intermediate receivers and distal receivers, the distal receivers being located further from the transmitter than the intermediate receivers.

Similarly, the transmitter may generate a chirp signal comprising interleaved packets of a plurality of further packet types, each packet type comprising symbols having different time periods and corresponding bandwidths. The longer the symbol time period, the shorter the bandwidth as previously described. Preferably, the longer the symbol time period, the less frequent the packet type in the chirp signal. Suitably, packets having different packet types are encoded with the same data, such that receivers located at a range of distances from the transmitter are able to detect and decode the data. The data encoded in the different packet types may have different quality. For example long packets may contain lower quality speech data than shorter packets.

Suitably, the transmitter operates according to a protocol in which the chirp signal is transmitted according to a frequency hopping sequence which is known by the transmitter and receiver prior to transmission of the chirp signal by the transmitter. Suitably, the frequency hopping sequence is defined by the protocol. The frequency hopping sequence may be publicly known. Alternatively, the frequency hopping sequence may be negotiated between the transmitter and the receiver in advance of communication of the chirp signal. Suitably, the transmitter transmits the chirp signal such that consecutive hops in the frequency hopping sequence match the centre frequencies of consecutive packets. In other words, the sequence of centre frequencies of consecutive packets of the generated chirp signal matches the frequency hopping sequence. Alternatively, the transmitter transmits the chirp signal such that consecutive hops in the frequency hopping sequence match the centre frequencies of consecutive symbols. In other words, the sequence of centre frequencies of consecutive symbols of the generated chirp signal matches the frequency hopping sequence.

Suitably, a receiver configured to receive a chirp signal transmitted by the transmitter coherently integrates the energy of a received symbol in order to detect and decode that symbol. Distal receivers are able to detect longer symbols but not shorter symbols because longer symbols can be coherently integrated for longer and hence provide a higher receiver gain than the shorter symbols. The ratio of the receiver gain, assuming all other parameters are fixed, of a long symbol having a time period $t_2$, to the receiver gain of a shorter symbol having a time period $t_1$, is $10 \log_{10}(t_2/t_1)$. Therefore, as long as the receiver is able to coherently integrate the symbols having a longer time period, the use of longer time period symbols provides a more sensitive mode than the use of short time period symbols. The receiver is able to coherently integrate the symbols if the clock phase between the transmitter and receiver does not drift by more than about 100 degrees over the integration period.

Consequently, the use of a transmitter which generates chirp signals by interleaving packets having long symbols and short symbols but containing the same or similar data, increases the sensitivity of the system (i.e. enables distal or noisy receivers to detect the data) without resorting to increasing the transmit power or adding forward error correction bits to the signal. This enables the transmitter and receiver devices to be more compact and lower power than those that implement FEC.

By generating an interleaved chirp signal as described herein, the same transmitter modem design is able to be used for communicating data to receivers located at different distances from the transmitter and to receivers capable of coherently integrating the received signal and to receivers not capable of coherently integrating the received signal.

A further configurable property of the chirp signal is the symbol value p. The N samples of a chirp are cyclically shiftable. For example, the particular cyclically shifted position of the samples in a chirp relative to a default position can be used to define the symbol value. In other words the cyclic phase of the N samples of a chirp can be related to the symbol value. There are N different cyclic phases of a chirp, and hence, in this example, N different possible symbol values. Suitably, the symbol value p is used to convey data. The amount of data that is conveyed by the symbol value of one symbol depends on the value of N. For example, if N is 257, then there are 257, different possible symbol values. Consequently, the detected symbol value could be used to convey approximately 8, bits of data. For example, if p is 10, then this could be interpreted as the 8, bits 00001010. Similarly, if p is 40, then this could be interpreted as the 8, bits 00101000. Further bits can be encoded by whether the chirp is an up-chirp or a down-chirp.

Suitably, the symbol's value p is used to convey data. Suitably, this is achieved by controlling the starting frequency of the chirp. Alternatively, this is achieved by evaluating equation 1 using the selected p values. FIG. 5 illustrates the concept of using the symbol value p to convey data by showing two chirps both having unity gradient. Chirp 1 has a starting frequency of −Fs/2. The symbol value p of chirp 1 is such that the chirp increases in frequency to +Fs/2 over N samples. Chirp 2 has a starting frequency of −Fs/4. The symbol value p of chirp 2 is such that the chirp increases in frequency to +Fs/2, in less than N samples and then drops down to −Fs/2, and returns to −Fs/4, after N samples. Suitably, the chirp receiver detects the symbol value of each symbol in the chirp signal in order to decode the data in the chirp signal.

Figure 6:
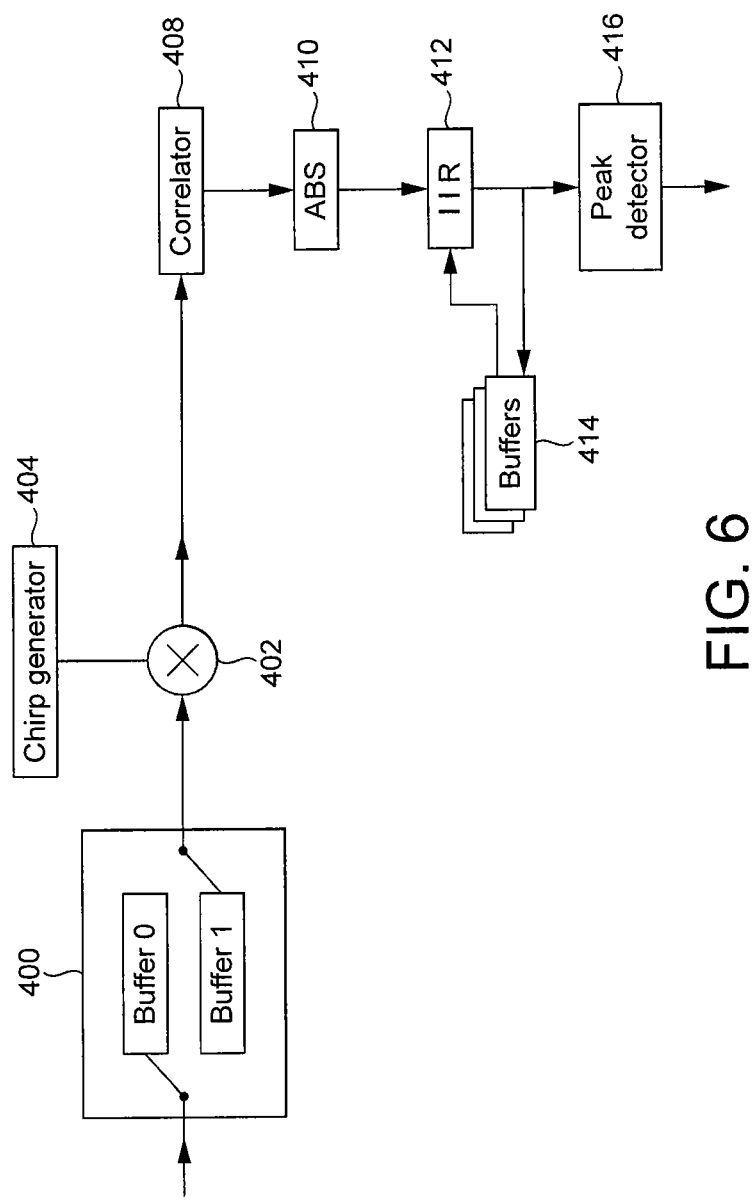
FIG. 6 illustrates a schematic diagram of the exemplary components of a chirp receiver.

Reference is now made to FIG. 6 which is a schematic diagram of the exemplary components of a chirp receiver.

A chirp signal is received at the chirp receiver and the samples of a received chirp of the chirp signal are input to buffer module 400. Suitably, buffer module 400 comprises two buffers. This enables an input buffer to be receiving samples whilst the output buffer is being read. When the input buffer becomes full the two buffers are swapped over so that input samples can continue to be sampled and stored without loss. If one of a set of chirp gradients are expected, for example when decoding additional symbol bits by using $2^K$ gradients to represent K bits of additional information, or when wanting to communicate with one of a number of devices with different predefined gradients, then the output buffer may be read multiple times, once for each possible gradient. With suitably fast digital processing clock rates these buffers can provide a means to decode and track received chirps in real time. The received chirp samples output from the buffer module 400 are input to chirp multiplier 402.

Chirp generator 404 generates a reference chirp which has a gradient g' which differs from the gradient g of the chirp output from the buffer module 400 by a fixed value v. Preferably, this fixed value is 1. Preferably, g−g'=1. Preferably, the reference chirp has the same number of samples in a chirp N, sample rate (bandwidth) and centre frequency as the chirp output from the buffer module 400. Suitably, the receiver operates according to a protocol in which the gradient, the sample rate, the number of repeats of a chirp in each symbol, the number of samples N in each chirp, and the frequency hopping sequence of each symbol in the chirp signal are known by the receiver in advance of receiving the chirp signal. These properties may be defined by the protocol. These properties may be publicly known. Alternatively, one or more of these properties may be negotiated between the transmitter and the receiver in advance of communication of the chirp signal.

The chirp multiplier 402 multiplies the received chirp with the conjugate of the reference chirp generated by chirp generator 404. The mixed chirp output from the chirp multiplier 402 is input to correlator 408.

Figure 7:
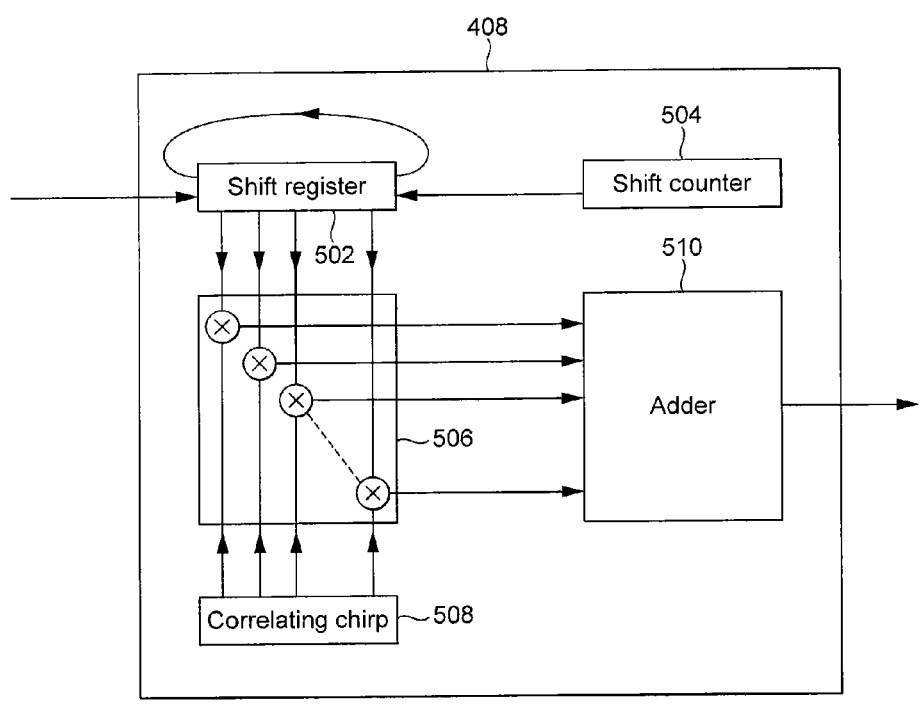
FIG. 7 illustrates a schematic diagram of a chirp correlator.

The correlator 408 correlates the mixed chirp with a conjugate of the fixed correlating chirp. The fixed correlating chirp has a gradient which is equal to the fixed value v. Preferably, the fixed correlating chirp has unity gradient. FIG. 7 illustrates a more detailed diagram of an exemplary correlator 408. The N samples of the mixed chirp signal output from chirp multiplier 402 are first loaded into N-stage circular shift register 502. The fixed gradient correlating chirp signal consists of one chirp of N samples which are preloaded into correlating chirp module 508. The shift counter 504 is preloaded with the number of shifts, and hence the number of outputs of correlator 408. During normal operation shift counter 504 is preloaded with N, but when using reduced symbol alphabets or if N is non-prime then shift counter 504 could be less than N. The correlator 408 comprises N complex multipliers 506, each taking a complex input from the N-stage circular shift register 502 samples, and the corresponding complex input from the correlating chirp module 508. The output from the N complex multipliers is then summed at adder 510 to yield a single complex correlator sample that is output from the correlator 408. For each successive correlation, the N-stage circular shift register 502 rotates by one. If the sample at the beginning of the N-stage circular shift register is s for one correlation, then the sample at the beginning of the N-stage circular register is s−1, for the next correlation. In this way, the correlator performs a correlation between the fixed gradient correlating chirp and N cyclic phases of the mixed chirp, generating N outputs. When the received chirp, the reference chirp and fixed correlating chirp have gradients such that g−g'≠v, then the correlator outputs small values for all cyclic phases. This is the case when the chirp receiver is not configured to correctly receive the chirp signal. When the received chirp, the reference chirp and fixed correlating chirp have gradients such that g−g'=v, the correlator outputs a strong correlation peak when the cyclic phase of the mixed chirp matches that of the fixed gradient correlating chirp and smaller values in other positions. In this way, the position of the correlation peak identifies the symbol value of the chirp. The data encoded in the chirp is then determined from the symbol value of the chirp.

Suitably, the output of the correlator 408 is input to an absolute value module 410. The absolute value module returns the magnitude of the complex input signal from the correlator 408. Suitably, the output of absolute value module 410 is input to an integrator 412. In some transmitter receiver configurations the received chirp signal comprises a set of individual chirps which are all identical, i.e. they have the same gradient and symbol value. The integrator is configured to integrate the corresponding correlator outputs of each of the individual chirps. So, for example, the integrator integrates the correlator output of each individual chirp for the case when the N-stage circular shift register is in the position s=1. Similarly, the integrator integrates the correlator output of each individual chirp for the case when the N-stage circular shift register is in the position s=2,, and so on. The integrator performs the integration by storing the N samples of the correlator output for a specific s position of the first chirp in the set in the buffers 414. It then retrieves these stored N samples from buffers 414 and performs an average of them with the N samples of the corresponding correlator output of the second chirp in the set. It then stores this averaged output in the buffers 414. It then retrieves these stored N samples from buffers 414 and performs an average of them with the N samples of the corresponding correlator output from the third chirp in the set. The iteration continues until all the chirps in the chirp set have been integrated. This integration technique is non-coherent integration. In one approach all the samples from repeated chirps are stored in memory, before an average is performed. Alternatively, if memory is limited the integrator might perform the average using N IIR (infinite impulse response) filters, with coefficients suitably chosen for the expected number of identical chirps in a symbol.

In an alternative implementation, the receiver device of FIG. 6 may be modified such that the absolute value module 410 is after the integrator 412. In this case the integrator 412 is a complex integrator. In this case the integration technique is coherent integration.

For the case where the frequency drift between transmitter and receiver is sufficiently small, this integrated output results in more accurate correlation peak detection, which is performed in peak detection module 416.

Figure 8:
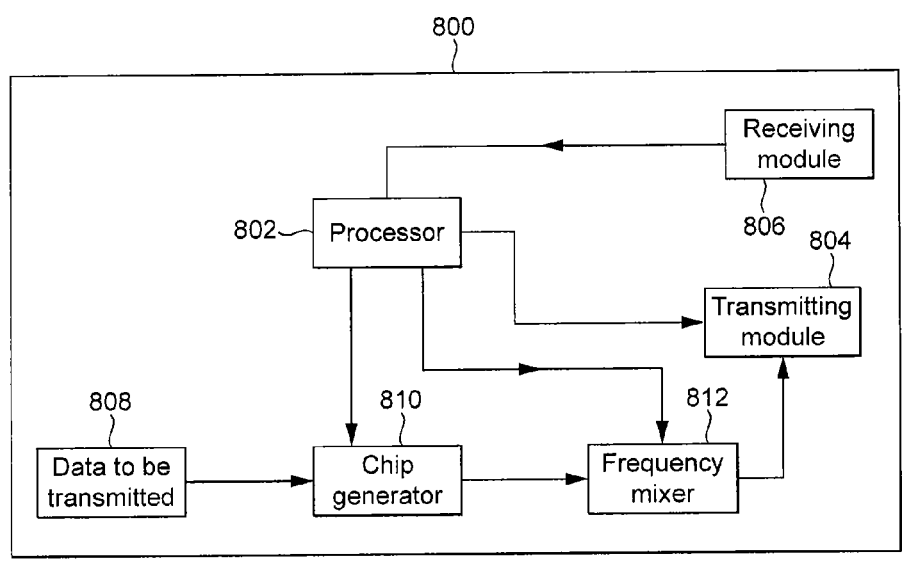
FIG. 8 illustrates a schematic diagram of the exemplary components of a chirp transmitter.

FIG. 8 illustrates a schematic diagram of an exemplary transmitter according to the methods described herein. If the frequency hopping sequence associated with the communication is negotiated between the transmitter and the receiver in advance of the communication of the chirp signal, the negotiating communications are transmitted to a receiver by transmitting module 804 and negotiating communications from a receiver are received by receiving module 806. Processor 802 of transmitter 800 is configured to perform these negotiating steps. Processor 802 is further configured to inform chirp generator 810 of the configurable parameters associated with the communication, for example the time period of each symbol, the number of chirps per symbol, the bandwidth of each symbol, the order of packet types in the interleaved signal. These configurable parameters may be the result of negotiation with the receiver. Alternatively, the parameter configuration may be determined by the transmitter independent of the receiver. The chirp generator 810 also receives the data to be transmitted as an input. The chirp generator 810 generates chirps according to the methods described herein. For example, chirp generator 810 generates chirps in accordance with equation 1, and the inputs it receives from the processor 802 and data to be transmitted 808. The chirp signal output by the chirp generator is then mixed up to the transmitted frequency by frequency mixer 812 in accordance with the methods described herein. For example, frequency mixer 812 mixes up to the transmitter frequency in accordance with the frequency hopping sequence input to the frequency mixer 812 from the processor 802. Transmitting module 804 then transmits the mixed chirp signal to the receiver.

FIGS. 6, 7 and 8 illustrate schematic diagrams showing exemplary components of receivers, a correlator and a transmitter according to the methods described herein. These figures illustrate the layout of these devices in terms of functional boxes. The operations of one or more of these functional boxes may be combined. It will be understood that these figures do not illustrate those conventional components of these devices known to a person skilled in the art.

In a specific example, the data chirp signal to be communicated comprises chirps, wherein each chirp is described by a Zadoff-Chu code. Suitably, contiguous symbols have different Zadoff-Chu codes. Suitably, contiguous symbols also have different centre frequencies as defined by a frequency hopping sequence. Using different Zadoff-Chu codes for each symbol provides a degree of coded separation, allowing more than one user to use the frequency spectrum at the same time.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of communicating a chirp signal from a transmitter suitable for receipt at a proximal receiver and a distal receiver, the chirp signal comprising a plurality of packets, each packet comprising at least one symbol, each symbol comprising one or more chirps, the method comprising:
generating the chirp signal by interleaving a plurality of packets of a first set of packets with a plurality of packets of a second set of packets, wherein:
(i) the first set of packets is encoded with first data, each packet comprising one or more symbols having a first time period $t_1$, and
(ii) the second set of packets is encoded with second data, each packet comprising one or more symbols having a second time period $t_2$, where $t_1 < t_2$, such that the ratio of packets of the first set of packets to packets of the second set of packets of the chirp signal is greater than 1, and
transmitting the generated chirp signal,
wherein each packet in the transmitted chirp signal is encoded with the same data.

2. The method as claimed in claim 1, wherein the one or more symbols of each packet of the first set of packets have a first bandwidth $bw_1$, and the one or more symbols of each packet of the second set of packets have a second bandwidth $bw_2$, wherein $bw_1 > bw_2$.

3. The method as claimed in claim 1, wherein the number of chirps per symbol of the first set of packets is different to the number of chirps per symbol of the second set of packets.

4. The method as claimed in claim 1 wherein the chirp signal is suitable for receipt at the proximal receiver, the distal receiver, and at least one further receiver located between the proximal and distal receivers, the method comprising generating the chirp signal by interleaving constituent packets of:
(i) the first set of packets,
(ii) the second set of packets, and
(iii) at least one further set of packets encoded with third data, each packet comprising one or more symbols having a time period between $t_1$ and $t_2$.

5. The method as claimed in claim 4, wherein the first data, second data and third data are the same.

6. The method as claimed in claim 1, wherein the one or more symbols of each packet of the at least one further set of packets have bandwidths between $bw_1$ and $bw_2$.

7. The method as claimed in claim 1, comprising:
negotiating a frequency hopping sequence between the transmitter and a receiver; and
transmitting the generated chirp signal such that the sequence of centre frequencies of consecutive packets of the generated chirp signal matches the frequency hopping sequence.

8. The method as claimed in claim 1, comprising:
negotiating a frequency hopping sequence between the transmitter and a receiver; and
transmitting the generated chirp signal such that the sequence of centre frequencies of consecutive symbols of the generated chirp signal matches the frequency hopping sequence.

9. A hardware transmitter for communicating a chirp signal suitable for receipt at a proximal receiver and a distal receiver, the chirp signal comprising a plurality of packets, each packet comprising at least one symbol, each symbol comprising one or more chirps, the transmitter comprising:
a chirp generator configured to generate the chirp signal by interleaving a plurality of packets of a first set of packets with a plurality of packets of a second set of packets, wherein:
(i) the first set of packets is encoded with first data, each packet comprising one or more symbols having a first time period $t_1$, and
(ii) the second set of packets is encoded with second data, each packet comprising one or more symbols having a second time period $t_2$, where $t_1 < t_2$, such that the ratio of packets of the first set of packets to packets of the second set of packets of the chirp signal is greater than 1; and
a transmitter module configured to transmit the generated chirp signal,
wherein each packet in the transmitted chirp signal is encoded with the same data.

10. The hardware transmitter as claimed in claim 9, wherein the one or more symbols of each packet of the first set of packets have a first bandwidth $bw_1$, and the one or more symbols of each packet of the second set of packets have a second bandwidth $bw_2$, wherein $bw_1 > bw_2$.

11. The hardware transmitter as claimed in claim 9, wherein the number of chirps per symbol of the first set of packets is different to the number of chirps per symbol of the second set of packets.

12. The hardware transmitter as claimed in claim 9 for communicating a chirp signal suitable for receipt at the proximal receiver, the distal receiver, and at least one further receiver located between the proximal and distal receivers, the chirp generator configured to generate the chirp signal by interleaving constituent packets of:
(i) the first set of packets,
(ii) the second set of packets, and
(iii) at least one further set of packets encoded with third data, each packet comprising one or more symbols having a time period between $t_1$ and $t_2$.

13. The hardware transmitter as claimed in claim 12, wherein the first data, second data and third data are the same.

14. The hardware transmitter as claimed in claim 12, wherein the one or more symbols of each packet of the at least one further set of packets have bandwidths between $bw_1$ and $bw_2$.

15. The hardware transmitter as claimed in claim 9, comprising a processor configured to negotiate a frequency hopping sequence between the transmitter and a receiver; and
   wherein the transmitting module is configured to transmit the generated chirp signal such that the sequence of centre frequencies of consecutive packets of the generated chirp signal matches the frequency hopping sequence.

16. The hardware transmitter as claimed in claim 9, comprising a processor configured to negotiate a frequency hopping sequence between the transmitter and a receiver; and
   wherein the transmitting module is configured to transmit the generated chirp signal such that the sequence of centre frequencies of consecutive symbols of the generated chirp signal matches the frequency hopping sequence.

\* \* \* \* \*

UNITED STATES PATENT AND TRADEMARK OFFICE
CERTIFICATE OF CORRECTION

Page 1 of 2

PATENT NO. : 8,848,827 B2
APPLICATION NO. : 13/471734
DATED : September 30, 2014
INVENTOR(S) : Hiscock It is certified that error appears in the above-identified patent and that said Letters Patent is hereby corrected as shown below:

In the Specification,

In Column 1, Line 35, delete "N-1," and insert -- N-1 --, therefor.

In Column 1, Line 38, delete "than 0," and insert -- than 0 --, therefor.

In Column 1, Line 39, delete "between 1, and N-1." and insert -- between 1 and N-1. --, therefor.

In Column 1, Line 41, delete "N-2," and insert -- N-2 --, therefor.

In Column 1, Line 46, delete "-Fs/2," and insert -- -Fs/2 --, therefor.

In Column 1, Line 49, delete "+Fs/2," and insert -- +Fs/2 --, therefor.

In Column 1, Line 53, delete "+Fs/2 at n=N-1,," and insert -- +Fs/2 at n=N-1, --, therefor.

In Column 1, Line 54, delete "n=0," and insert -- n=0 --, therefor.

In Column 1, Line 59, delete "gradient of 2," and insert -- gradient of 2 --, therefor.

In Column 1, Line 61, delete "+Fs/2," and insert -- +Fs/2 --, therefor.

In Column 1, Line 63, delete "+Fs/2," and insert -- +Fs/2 --, therefor.

In Column 1, Line 67, delete "-Fs/2, to +Fs/2, between samples N/2," and insert -- -Fs/2 to +Fs/2 between samples N/2 --, therefor.

In Column 4, Line 19, delete "gradient of 2," and insert -- gradient of 2 --, therefor.

Signed and Sealed this
Tenth Day of March, 2015

Michelle K. Lee
*Deputy Director of the United States Patent and Trademark Office*

CERTIFICATE OF CORRECTION (continued)
U.S. Pat. No. 8,848,827 B2

In Column 5, Lines 17-18, delete "from 0, to N-1," and insert -- from 0 to N-1 --, therefor.

In Column 5, Line 21, delete "greater than 0," and insert -- greater than 0 --, therefor.

In Column 5, Line 22, delete "between 1," and insert -- between 1 --, therefor.

In Column 5, Line 24, delete "N-2," and insert -- N-2 --, therefor.

In Column 6, Line 58, delete "time period $t_3$," and insert -- time period $t_3$ --, therefor.

In Column 7, Line 46, delete "time period $t_2$," and insert -- time period $t_2$ --, therefor.

In Column 7, Line 47, delete "time period t1," and insert -- time period t1 --, therefor.

In Column 8, Lines 13-14, delete "N is 257, then there are 257," and insert -- N is 257 then there are 257 --, therefor.

In Column 8, Line 16, delete "approximately 8," and insert -- approximately 8 --, therefor.

In Column 8, Line 16, delete "p is 10," and insert -- p is 10 --, therefor.

In Column 8, Line 17, delete "the 8, bits" and insert -- the 8 bits --, therefor.

In Column 8, Line 18, delete "40, then" and insert -- 40 then --, therefor.

In Column 8, Line 18, delete "the 8, bits" and insert -- the 8 bits --, therefor.

In Column 8, Line 31, delete "+Fs/2," and insert -- +Fs/2 --, therefor.

In Column 8, Line 32, delete "-Fs/2, and returns to -Fs/4," and insert -- -Fs/2 and returns to -Fs/4 --, therefor.

In Column 9, Line 34, delete "s-1," and insert -- s-1 --, therefor.

In Column 9, Line 64, delete "s=2,," and insert -- s-2, --, therefor.

In Column 10, Line 45, delete "equation 1," and insert -- equation 1 --, therefor.